United States Patent [19]

Scribner

[11] Patent Number: 4,516,209

[45] Date of Patent: May 7, 1985

[54] POSTAGE METERING SYSTEM HAVING WEIGHT CHECKING CAPABILITY

[75] Inventor: Albert W. Scribner, Darien, Conn.

[73] Assignee: Pitney Bowes Inc., Stamford, Conn.

[21] Appl. No.: 465,131

[22] Filed: Feb. 9, 1983

[51] Int. Cl.³ .................... G06F 15/20; G01G 23/38
[52] U.S. Cl. .................................. 364/466; 177/25; 177/4; 209/900
[58] Field of Search ............. 364/466; 177/4, 25, 177/50, 1, DIG. 6; 209/900, 564, 698

[56] References Cited

U.S. PATENT DOCUMENTS

| | | | |
|---|---|---|---|
| 3,635,297 | 1/1972 | Salava | 364/466 X |
| 3,724,570 | 4/1973 | Chenut | 177/4 |
| 3,890,492 | 6/1975 | Manduley et al. | 364/466 |
| 3,901,797 | 8/1975 | Storace et al. | 177/4 X |
| 4,024,380 | 5/1977 | Gunn | 209/900 X |
| 4,047,006 | 9/1977 | Ellner | 364/466 |
| 4,286,325 | 8/1981 | Dlugos et al. | 364/466 |
| 4,308,579 | 12/1981 | Dlugos | 364/466 X |
| 4,319,328 | 3/1982 | Eggert | 364/466 |
| 4,326,254 | 4/1982 | Uchimura et al. | 177/25 X |
| 4,366,552 | 12/1982 | Uchimura et al. | 364/466 X |

*Primary Examiner*—Edward J. Wise

*Attorney, Agent, or Firm*—Robert H. Whisker; William D. Soltow, Jr.; Albert W. Scribner

[57] ABSTRACT

A postage metering system including a scale and having the capacity to check the weight of items to be mailed and including apparatus for printing postage indicia on items falling outside a preselected range is disclosed. The system includes a postage metering subsystem, having the capability to print indicia corresponding to a particular postage value, a scale for determining if the weight is within the preselected range, apparatus to set the particular postage value to be printed and apparatus for determining the preselected range as a predetermined function of the particular postage value. The determining apparatus may also determine the particular postage value from input data using a conventional weight-to-postage routine and may use such a weight-to-postage routine to determine the preselected weight range. In one embodiment, the printing apparatus is enabled only when the weight of the item to be mailed is within the preselected range. In a second embodiment, the system includes a transportation apparatus for sequentially transporting items to be mailed through the scale and printing apparatus, and including a gate mechanism between the scale and the printing apparatus for diverting items with weights outside the preselected range before they are imprinted.

15 Claims, 7 Drawing Figures

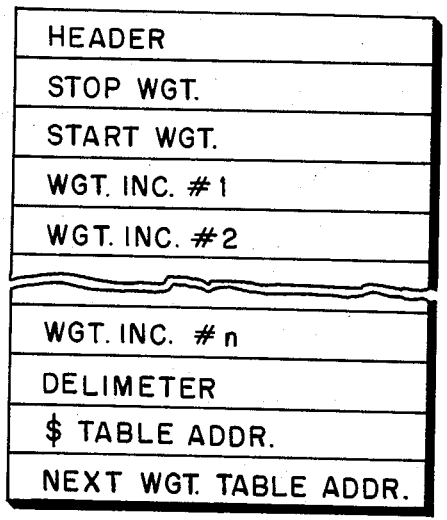
FIG. 2a
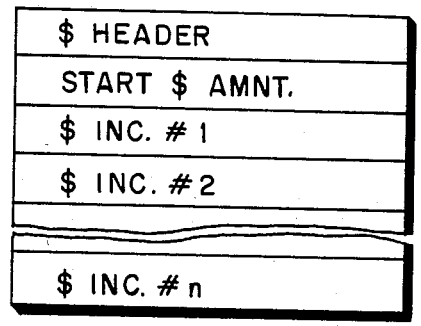
FIG. 2b
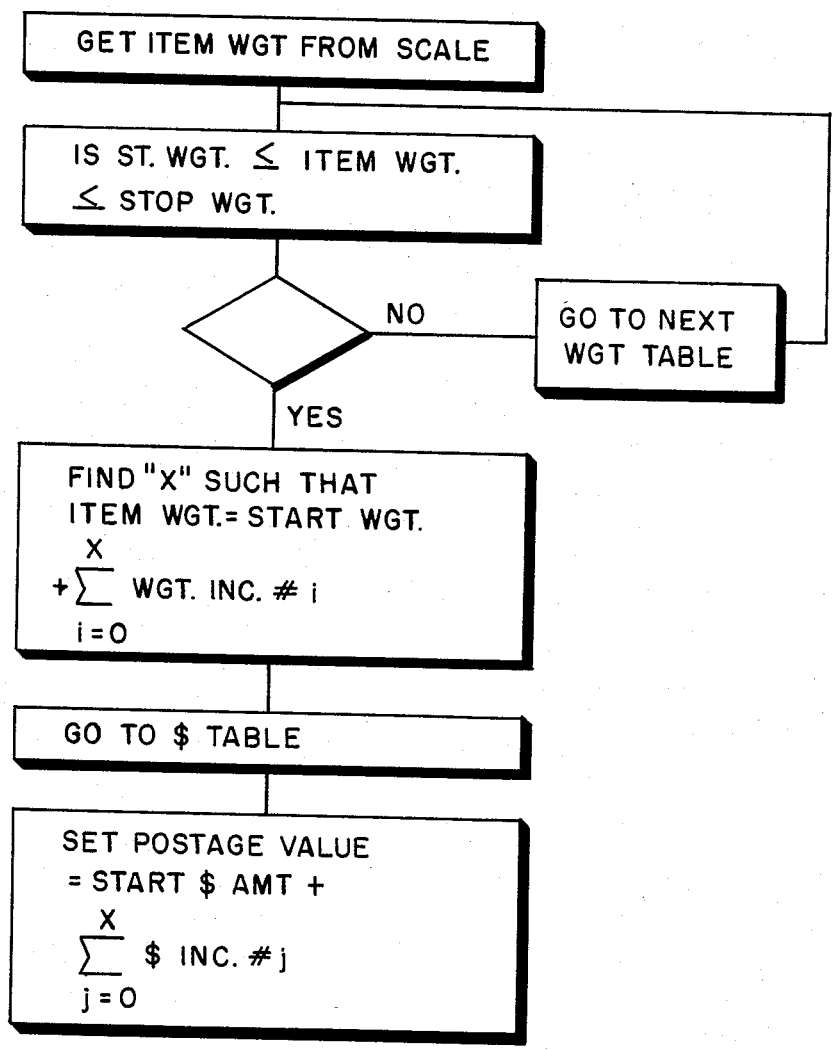
FIG. 2c
FIG. 2

POSTAGE METERING SYSTEM HAVING WEIGHT CHECKING CAPABILITY

BACKGROUND OF THE INVENTION

Postage metering systems comprising a scale for determining the weight of an item to be mailed, a postage meter for printing indicia corresponding to particular postage values, and processing means for receiving weight information from the scale, computing the appropriate postage value for the weighed item, possibly using other postal information relating to the weighed item input by an operator, and means for setting the postage meter accordingly, are well known in the art. Such systems are typified by the system disclosed in U.S. Pat. No. 4,308,579, *Multiprocessor Parcel Postage Metering System Having Serial Data Bus*, to Dlugos, issued Dec. 29, 1981. A detailed description of the computation of postage values in such a system is disclosed in U.S. Pat. No. 4,286,325, *System and Method for Computing Domestic and International Postage*, to Dlugos et al., issued Aug. 25, 1981. Such systems may be incorporated in automatic mixed mail handling systems, such as that disclosed in U.S. Pat. No. 3,890,492, *Postage Value Determining and Control Circuit*, to Manduley et al., issued June 17, 1975. In such systems pieces of mixed mail move serially along a feed path, first through a weighing station, then through a postage meter. As each piece of mail is weighed, the proper postage is determined and the postage meter set appropriately.

All of the above-mentioned patents are hereby incorporated by reference.

Of course, in systems such as those described above, considerable time could be saved in processing batches of uniform mail by presetting the postage meter and not weighing each piece of mail and determining the postage separately for each piece. Such a mode of use, however, introduces several possible problems. An operator may mis-set the postage meter allowing an entire batch of mail to be sent out with too much or too little postage, or in fact the batch of mail may not in fact be uniform, or, in systems where the items are fed through the system automatically, the system may feed two or more items through together, allowing some items to be sent out without postage at all.

A system which attempts to deal in part with some of the above-described problems is disclosed in U.S. Pat. No. 3,724,570, to Chenut, which discloses a preset weigher and a preset postage printer and an alarm means to prevent printing if a letter weighs more than a preset weight. This system, however, reintroduces some of the problems which the systems disclosed in incorporated references overcome. Thus, the operator of the system disclosed in the Chenut reference must not only properly set the meter for the items to be mailed but he must also properly determine the maximum weight which may be mailed for that postage; giving the operator two chances to make the kind of mistakes which postage metering systems were developed to avoid.

Thus, it is an object of the subject invention to provide a postage metering system capable of handling batches of uniform mail at a relatively high speed while minimizing the possibility that items will be mailed with either too much or too little postage.

It is a further object of the present invention to provide such a system wherein the opportunities for operator error are minimized.

It is still a further object of the subject invention to provide a system, wherein a uniform batch of items to be mailed may automatically be serially fed through a postage meter, wherein the system has the capability to detect "doubles", i.e., two or more items inadvertently passing through the system together.

BRIEF SUMMARY OF THE INVENTION

The above objects are achieved and the disadvantages of the prior art are overcome by the subject invention which comprises a postage meter, the postage meter further comprising a printing apparatus for printing indicia corresponding to the postage value selected for an item to be mailed, and a scale for determining if the weight of said item is within a predetermined range of weights; the scale being operatively connected to the postage meter so that the printing apparatus may print the indicia only if the weight of the item is within the predetermined weight range. The subject invention further comprises setting apparatus for setting the printing apparatus so that the indicia correspond to a particular selected postage value and a processing apparatus operatively associated with the setting apparatus and the scale, the processing apparatus establishing the predetermined range used by the scale as a predetermined function of the particular selected postage value.

In a preferred embodiment of the subject invention, the predetermined weight range may be from the minimum weight for which the particular selected postage value is necessary to the maximum for which it is sufficient.

In still another preferred embodiment, the predetermined weight range is a predetermined function of the particular selected postage value and other related postal information such as postal class and special fees which may be entered by the system operator.

It is a particular advantage of the subject invention that it may readily be incorporated into mixed mail postage metering systems such as those disclosed in the incorporated references.

It is another particular advantage of the subject invention that such systems may switch between mixed mail and uniform mail modes in a simple and straight forward manner with little chance for operator error.

Other objects and advantages of the subject invention will be readily apparent to those skilled in the art from consideration of the attached drawings and the Detailed Description of Preferred Embodiments of the Invention set forth below.

BRIEF DESCRIPTION OF THE DRAWINGS

FIGS. 2 (FIGS. 2a, 2b, and 2c) is a flow chart showing the computation of a postage value in the prior art in a simplified form with associated weight and dollar tables.

DETAILED DESCRIPTION OF PREFERRED EMBODIMENTS OF THE SUBJECT INVENTION

Figure 1:
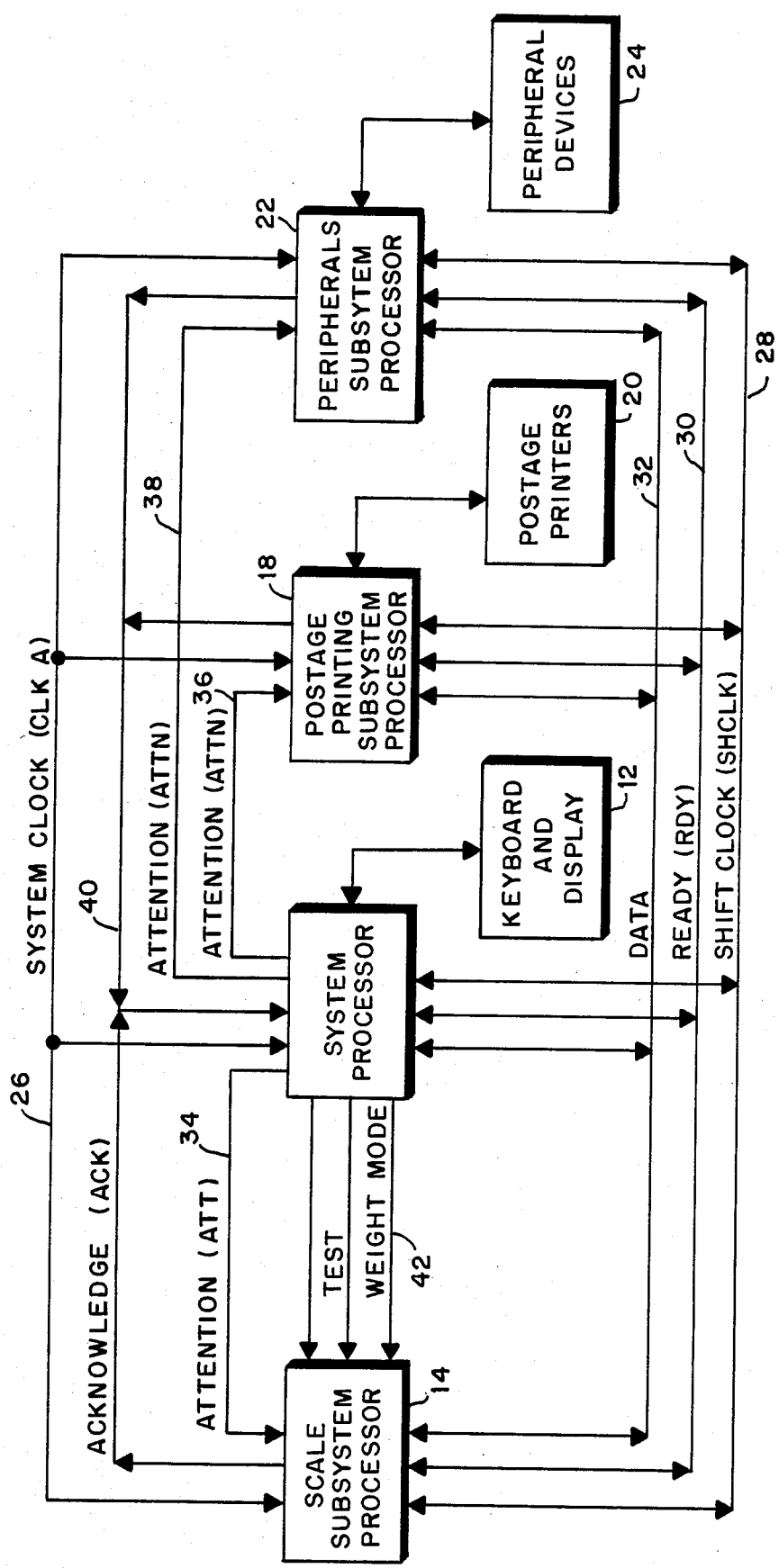
FIG. 1 is a schematic diagram of a prior art postage metering system.

Referring to FIG. 1, the control component of a postage metering system shown therein is a system processor 10 which interfaces with an operator through an input/ouput subsystem 12 which includes a keyboard and visual display. The system processor 10 receives weight information from a scale subsystem processor 14. The system processor 10 is also connected to a postage printing subsystem processor 18 which sets and operates one or more postage printers 20. The connection between the postage subsystem processor 18 and the postage printers 20 is shown as bidirectional since the postage printers 20 include sensors which signal the current setting of printers 20 to processor 18. The system processor 10 may also communicate with a peripheral subsystem processor 22 which can control and monitor a number of peripheral devices 24 including, for example, a parcel identification counter and a floppy disk or magnetic tape unit for recording system transactions.

Referring to FIG. 2, a simplified outline of the computation of a postage value for an item of a given weight by the prior art postage metering system of FIG. 1 is shown. When system processor 10 receives an item weight from scale subsystem processor 14 it determines an appropriate postage value from weight tables similar to those shown in FIG. 2a and associated dollar tables similar to those shown in FIG. 2b in accordance with a routine similar to that shown in FIG. 2c. Using this routine, the system processor first identifies the appropriate weight table, finds the item weight in that table (in terms of a start weight plus increments) goes to the associated dollar table and finds the proper postage value. Using a routine which is generally similar to that just described in the prior art postage metering systems determine appropriate postage values for large numbers of various cases such as various postal zones, different classes of postal service, special fees, etc. using additional postal information entered by the operator through the keyboard. Details of the complete prior art postage routine may be found in the incorporated Dlugos et al. reference, however, it is believed that the simplified description of FIG. 2 will enable those skilled in the art to fully understand the description of the subject invention set forth below. Hereinafter such routines, and others known to those skilled in the art will be referred to generally as "weight-to-postage" routines.

Figure 3:
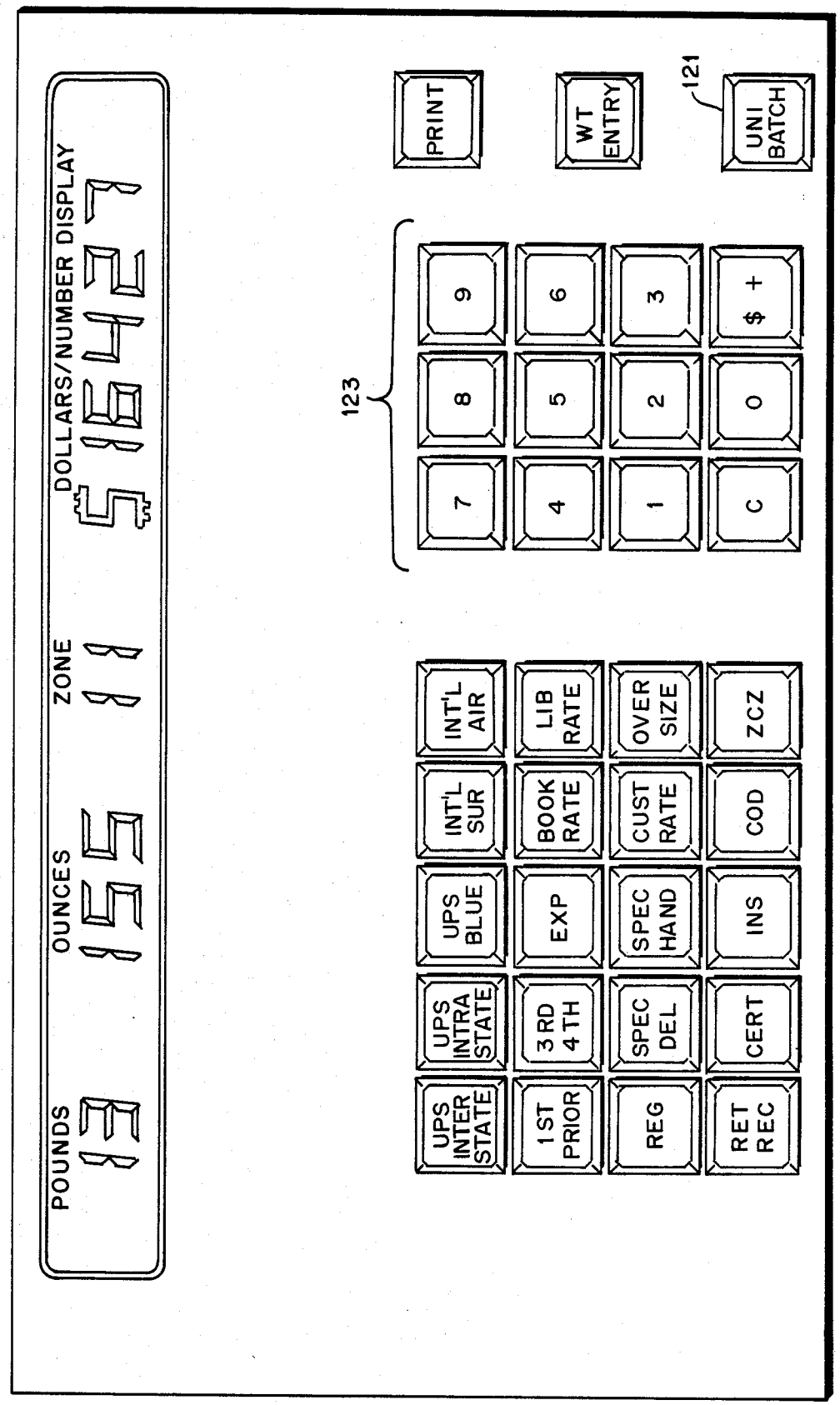
FIG. 3 is a plan view of keyboard used in the system of FIG. 1 as modified in accordance with the subject invention.

Turning to FIG. 3, the keyboard of the system of FIG. 1, as modified in accordance with the subject invention, is shown. An additional input 121 serves to switch the system into a uniform batch mode. In contrast to the mixed mail operation of prior art systems, wherein postage values for each item are determined in accordance with a weight-to-postage routine, when the operator switches to uniform batch mode system processor 10, as modified in accordance with the subject invention, must determine a weight range corresponding to a particular selected postage value. In one embodiment of the subject invention, such a particular postage value may be entered using the numerical keys 123 of the keyboard. In another embodiment a particular weight may be entered using keys 123, along with additional postal information such as class of postal service, etc. if necessary, and system processor 10 may determine the particular postage in accordance with a weight-to-postage routine. In yet another embodiment, the particular weight may be determined by weighing a sample item from the uniform batch to be mailed and using the weight-to-postage routine.

Figure 4:
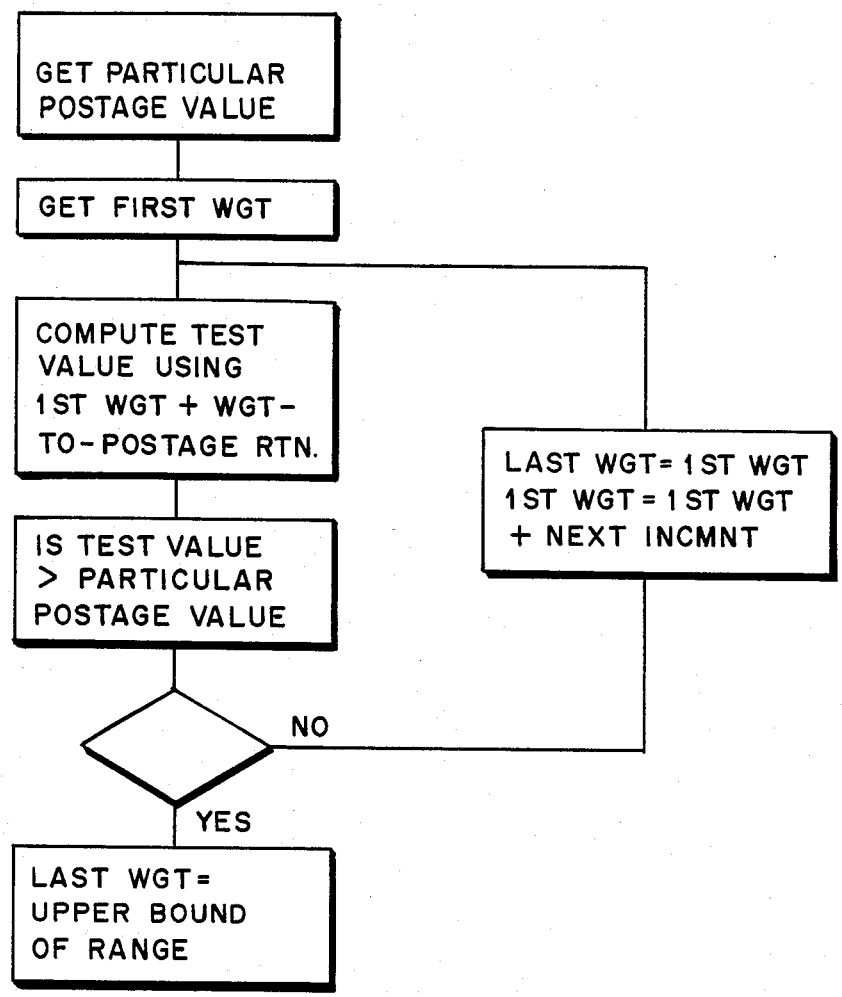
FIG. 4 is a flow chart showing the computation of a weight range in accordance with the subject invention.

Having received the selected postage value system, processor 10 must determine the corresponding weight range. While it would be within the skill of a person skilled in the art to develop a routine which would map postage values into weight ranges such a routine would be extensive, requiring a large amount of memory space, and would also require extensive testing to validate it. In order to avoid these problems, it is preferred to make use of existing weight-to-postage routines in the uniform batch mode. Thus, FIG. 4 shows a routine in accordance with the subject invention wherein a weight-to-postage routine is used in determining a weight range associated with a particular selected postage. Having received a particular selected postage value, the system processor 10 selects a first weight and sequentially determines the postage for that weight and each incremental weight above the start weight until the determined postage value exceeds the selected postage value. The largest weight found defines a weight range with no lower bound and upper bound equal to the greatest weight which may be mailed for the selected postage value. The first weight may be an entered weight upon which the selected postage value is based or may simply be the small weight stored in the weight tables. Those skilled in the art will readily be able to extend the above description to the determination of other appropriate weight ranges, such as a range where the lower bound is the minimum weight which requires the selected postage.

In operation, each item is weighed on the scale of subsystem 14 and the weight is transmitted to system processor 10, which checks to see if the weight is within the corresponding weight range and signals the postage printing subsystem 18 to allow printing only if the item weight is within range. It is preferred that an enable signal be asserted to subsystem 18 when the item weight is within range, as opposed to a disable signal when the item weight is outside the range, to provide fail safe operation.

Figure 5:
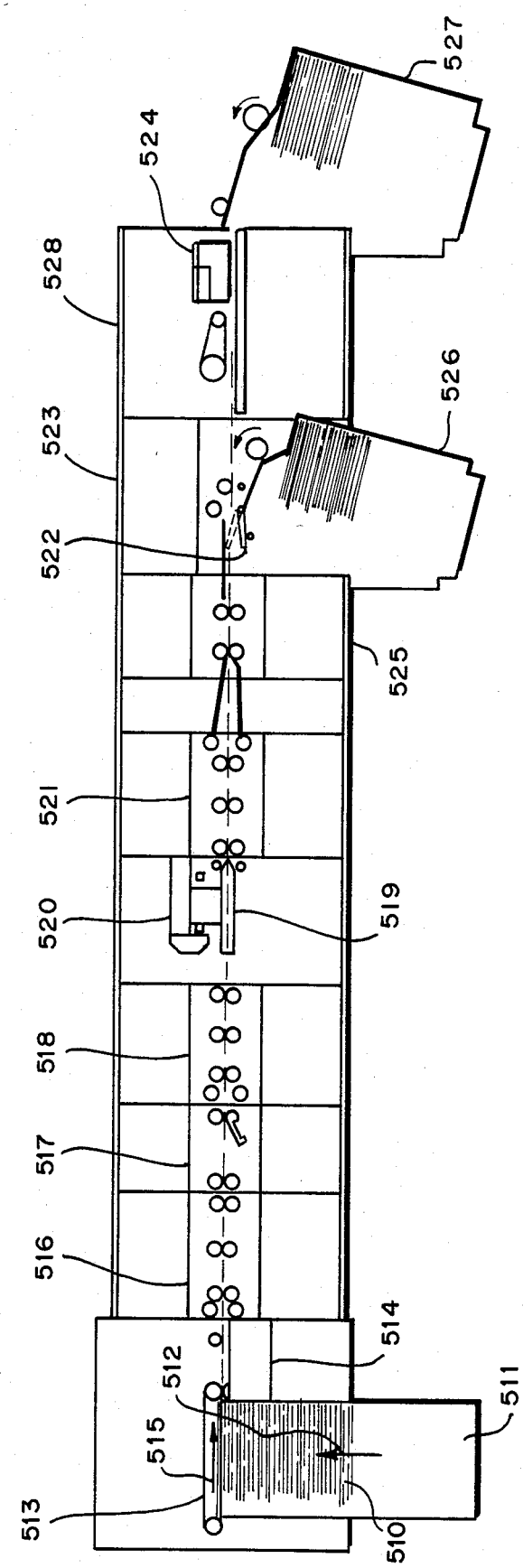
FIG. 5 shows a mail handling system comprising a postage metering system in accordance with the subject invention.

Turning to FIG. 5, there is shown an automatic mail handling system similar to that taught in the incorporated Manduley et al. reference. The system provides a serial feed path for transporting batches of letter mail through a weighing station 520 and a postage meter station 520. The system comprises a feeder 513, transfer stations 516, 518, 521 and 523, sealer station 517, and stacker 527, which are substantially similar to those disclosed in the incorporated Manduley reference and need not be described further for an understanding of the subject invention. Weighing station 520 comprises a scale 519 which may further comprise a scale subsystem and processor substantially similar to scale processor 14 and a system processor substantially similar to system processor 10. Postage meter station 528 may comprise a processor substantially similar to postage printing subsystem processor 18 and controlling postage printers substantially similar to postage printers 20. Postage meter station 528 may be controlled by scale 519 in a manner substantially similar to that described for the system of FIG. 1.

Select station 525 is operatively positioned in the serial feed path between weighing station 520 and postage meter station 528 and comprises gate 522 and reject stacker 526. Gate 522 is operatively connected to and controlled by scale 519 so that items with weights outside the appropriate range are diverted to reject stacker 526.

What is claimed is:

1. A postage metering system, comprising:
   (a) a postage meter subsystem, said meter subsystem further comprising printing means for printing indicia corresponding to a particular postage value selected for an item to be mailed;
   (b) weighing means for determining if the weight of said item is within a preselected range, said weighing means being operatively associated with said printing means so that said printing means may print said indicia only if the weight of such item is within said range;
   (c) setting means for setting said printing means so that said indicia correspond to a particular selected postage value; and,
   (d) determining means, operatively connected to said weighing means, for receiving data from which said particular selected postage value may be determined, and for determining said particular value, and for setting said preselected range as a predetermined function of said particular value.

2. A postage metering system as described in claim 1 further comprising an input/output subsystems operatively connected to said determining means whereby said determining means receives said data for determining said particular selected postage value through said input/output means.

3. A postage metering system as described in claim 2 wherein said data directly defines a particular weight and said determining means determines said particular postage value in accordance with a weight-to-postage routine.

4. A postage metering system as described in claim 3 wherein said determining means receives additional postal data relating to such item to be mailed and said particular postage value and said preselected range are determined in accordance with said additional data.

5. A postage metering system as described in claim 2 wherein said determining means receives additional postal data relating to such item to be mailed and said particular postage value and said preselected range are determined in accordance with said additional data.

6. A postage metering system as described in claim 2 wherein said particular postage value is determined by said determining means from the weight of a sample item measured by said weighing means and in accordance with a weight-to-postage routine.

7. A postage metering system as described in claim 6 wherein said determining means receives additional postal data relating to such item to be mailed and said particular postage value and said preselected range are determined in accordance with said additional data.

8. A postage metering system, comprising:
   (a) a postage meter, said meter further comprising printing means for printing indicia corresponding to a postage value selected for an item to be mailed;
   (b) weighing means for determining the weight of said item,
   (c) setting means for setting said printing means so that said indicia correspond to a particular selected postage value; and,
   (d) processing means operatively connected to said postage meter subsystem, said weighing means, and said setting means for:
   1. receiving data from which said particular selected postal value may be determined;
   2. determining said particular value and controlling said setting means so that said indicia correspond to said particular value;
   3. setting said predetermined range as a predetermined function of said particular value;
   4. receiving weight data for such an item to be mailed from said weighing means and determining if the weight of such item is within said predetermined range; and,
   5. controlling said postage meter subsystem so that said printing means may print said indicia only if the weight of such item is within said range.

9. A postage metering system as described in claim 8 further comprising an input/output subsystem operatively connected to said processing means whereby said processing means receives said data for determining said particular selected postage value through said input/output means.

10. A postage metering system as described in claim 9 wherein said data directly defines a particular weight and said determining means determines said particular postage value in accordance with a weight-to-postage routine.

11. A postage metering system as described in claim 10 wherein said processing means receives additional postal data relating to such item to be mailed and said particular postage value and said preselected range are determined in accordance with said additional data.

12. A postage metering system as described in claim 9 wherein said processing means receives additional postal data relating to such item to be mailed and said particular postage value and said preselected range are determined in accordance with said additional data.

13. A postage metering system as described in claim 9 wherein said particular postage value is determined by said processing means from the weight of a sample item measured by said weighing means and in accordance with a weight-to-postage routine.

14. A postage metering system as described in claim 13 wherein said processing means receives additional postal data relating to such item to be mailed and said particular postage value and said preselected range are determined in accordance with said additional data.

15. A postage metering system, comprising:
   (a) a postage meter subsystem, said meter subsystem further comprising printing means for printing indicia corresponding to a postage value selected for an item to be mailed;
   (b) weighing means for determining the weight of such items;
   (c) setting means for setting said printing means so that said indicia correspond to a particular selected postage value;
   (d) transport means for serially and sequentially transporting such items to be mailed through said weighing means and then through said postage meter subsystem so that such items may be imprinted within indicia corresponding to a particular selected postage value, said transport means further comprising a select station operatively positioned between said weighing means and said meter subsystem, said select station further comprising gating means for selectively diverting items from said transport means so that such diverted items do not pass through said meter subsystem; and (e) processing means, operatively connected to said postage meter subsystem, said weighing means, said gating means, and said setting means, for:
1. receiving data from which said particular selected postage value may be determined;
2. determining said particular value and controlling said setting means so that said indicia correspond to said particular value;
3. setting said preselected range as a predetermined function of said particular value;
4. receiving weight data for such an item to be mailed from said weighing means and determining if the weight of such item is within said preselected range; and,
5. controlling said gating means so that such item is diverted from said transport means if the weight of such item is not within said preselected range.

* * * * *